(12) United States Patent
Eichelberg

(10) Patent No.: US 9,484,727 B1
(45) Date of Patent: Nov. 1, 2016

(54) CABLE MANAGER

(71) Applicant: Amazon Technologies, Inc., Seattle, WA (US)

(72) Inventor: John William Eichelberg, Spokane, WA (US)

(73) Assignee: Amazon Technologies, Inc., Seattle, WA (US)

( * ) Notice: Subject to any disclaimer, the term of this patent is extended or adjusted under 35 U.S.C. 154(b) by 111 days.

(21) Appl. No.: 14/497,127

(22) Filed: Sep. 25, 2014

(51) Int. Cl.
*H02G 3/22* (2006.01)
*H02G 3/00* (2006.01)

(52) U.S. Cl.
CPC ............ *H02G 3/26* (2013.01); *H02G 2200/20* (2013.01)

(58) Field of Classification Search
CPC ............ H02G 3/22; H02G 3/26; H02G 3/24; H02G 3/28; H02G 3/30; H02G 3/36; H02G 15/007; H02G 2200/20; B60R 16/0222; B60R 16/0215; B60R 16/0207
USPC ............ 174/650, 152 G, 153 G, 152 R, 135; 385/134, 135; 248/68.1, 49, 56
See application file for complete search history.

(56) References Cited

U.S. PATENT DOCUMENTS

| | | | | | |
|---|---|---|---|---|---|
| 7,205,481 | B2 * | 4/2007 | Higbie | .................... | H02G 3/32 174/154 |
| 7,442,884 | B2 * | 10/2008 | Ball | .................... | H02G 15/013 248/56 |
| 7,700,877 | B2 * | 4/2010 | Delfosse | ................ | H02B 1/205 174/72 A |
| 7,952,027 | B2 * | 5/2011 | Grelck | .................... | H02G 3/32 174/68.1 |
| 8,183,475 | B2 * | 5/2012 | Dukes | ...................... | H02G 3/22 174/650 |
| 8,348,204 | B2 * | 1/2013 | Kataoka | ................. | H02G 3/088 248/68.1 |
| 8,744,228 | B2 * | 6/2014 | Womack | .............. | G02B 6/4471 385/135 |
| 8,772,642 | B2 * | 7/2014 | Ehmann | ................. | H02B 1/305 174/152 G |

* cited by examiner

*Primary Examiner* — Angel R Estrada
(74) *Attorney, Agent, or Firm* — Baker & Hostetler LLP

(57) ABSTRACT

A retention device for cables includes a plurality of channels configured to receive a plurality of cables having connector ends. The retention device includes a plurality of openings extending from the plurality of channels to an outer edge of the retention device such that the plurality of cables can be inserted into the plurality of channels. The retention device includes means for removably attaching the retention device to another retention device. The retention device is fabricated to be semi-rigid.

20 Claims, 3 Drawing Sheets

CABLE MANAGER

BACKGROUND

A data center is a facility that houses computer systems and various networking, storage, and other related components. Data centers may, for example, provide computing services to businesses and individuals as a remote computing service or to provide "software as a service" (e.g., cloud computing). The services provided by data centers are valuable to customers as the continued and reliable availability of the computing services are important to the customers' services and operations. It is thus necessary to provide reliable and efficient computing services in order to minimize disruptions to customers of the computing services.

BRIEF DESCRIPTION OF DRAWINGS

References are made to the accompanying drawings that form a part hereof, and that show, by way of illustration, specific embodiments or examples. The drawings herein are not drawn to scale. Like numerals represent like elements throughout the several figures. In the figures, reference numbers may be reused to indicate correspondence between referenced elements. The drawings are provided to illustrate example embodiments described herein and are not intended to limit the scope of the disclosure.

DETAILED DESCRIPTION

A data center may house many thousands of components, such as servers and network switches that are typically housed in equipment racks. A network switch, for example, is used to interconnect devices on a network and can have multiple ports to interconnect various devices using network cables. When a network switch fails or must otherwise be replaced, a technician typically replaces the switch by unplugging all cable connections on the connected ports. The cables are typically copper cables such as CAT5 with RJ45 jacks. The cables are specifically assigned a designated port and, when the switch is replaced, the technician must plug the cables back into the switch. During this process, the technician may get the cables out of order and plug the cables into the incorrect designated port.

The subject matter of the present disclosure is directed to a device, referred to herein as a cable manager device, cable manager apparatus, or cable manager, that is configured to hold and maintain cables in general alignment to their designated ports without the need to visually read cable labels and manually keep track of designated ports for each cable when their corresponding network devices are removed and replaced. The cable manager retains cables in pre-assigned positions so that the cables can be easily removed from their ports when the cables are plugged back in the network device.

Figure 1:
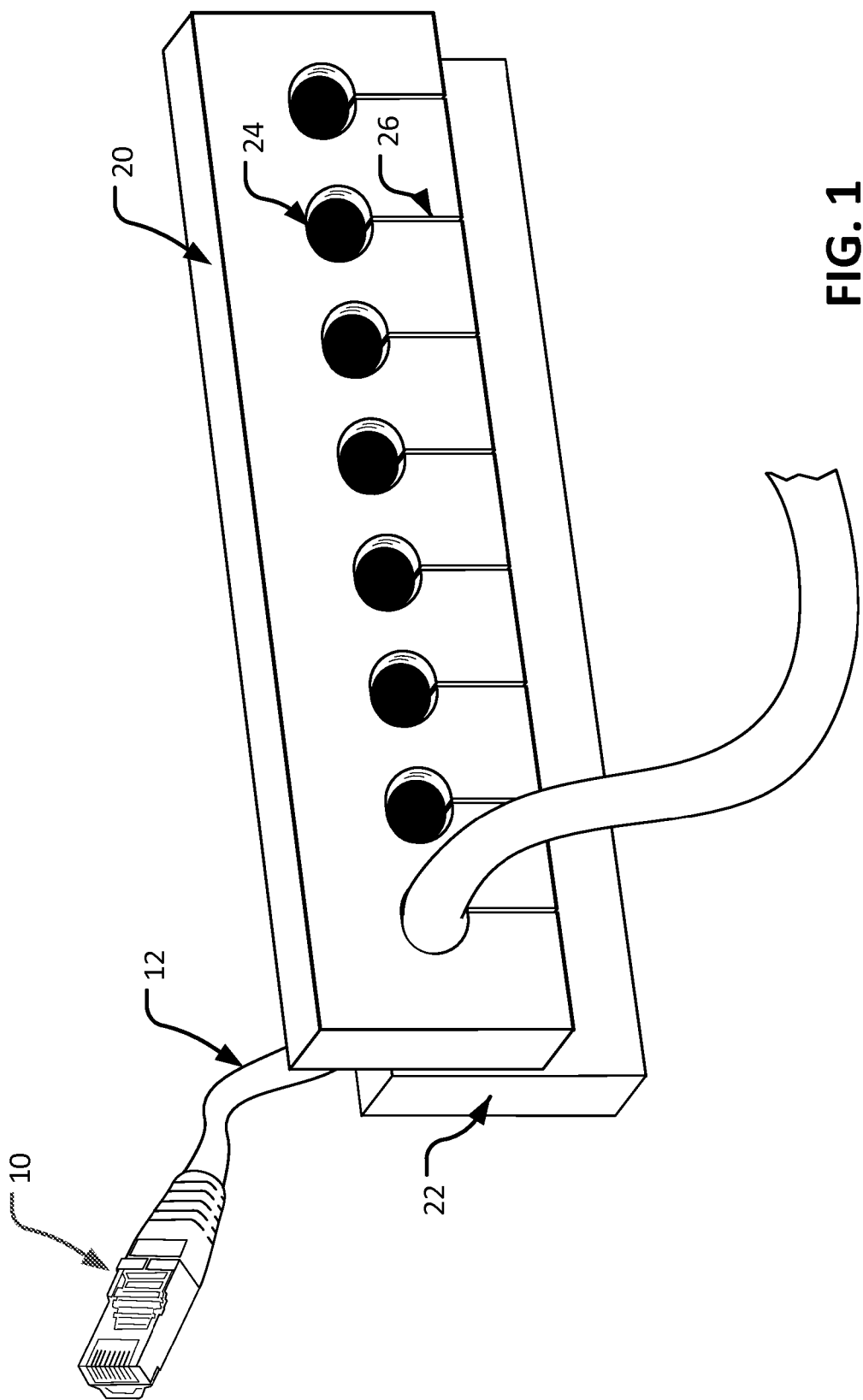
FIG. 1 is a diagram illustrating a mechanism for managing cables in accordance with the present disclosure.

FIG. 1 illustrates an example embodiment of a cable manager or a cable retention device in accordance with this disclosure. Illustrated is a first cable manager 20 and a second cable manager 22. First cable manager 20 can include one or more cable holding channels 24, each with a corresponding cable entry opening 26. FIG. 1 illustrates an RJ45 cable 12 with a jack or connector 10 that has been inserted in one of the cable holding channels 24. The first cable manager 20 and second cable manager 22 may be a semi-rigid material, such as foam rubber or Neoprene, so that cable 12 can be inserted into one of the cable holding channels 24 through the corresponding cable entry opening 26. The soft material is sufficiently rigid to retain inserted cables when the cables are removed from their devices and would otherwise be freestanding.

The second cable manager 22 may be oriented 180 degrees relative to the first cable manager 20 so that cable are inserted into the cable entry openings of the second cable manager 22 in the opposite direction and are retained from opposite directions. By using two cable managers in this manner, the cables are less prone to being inadvertently removed through the cable entry openings during removal and replacement of the network devices. While the present embodiment is described in the context of a network switch using RJ45 cables, the cable manager may be used in conjunction with any type of connectors and cables where it is desirable to retain the relative position of a plurality of cables during removal/replacement operations.

More generally, local area networks and telecommunications connections often use patch panels on equipment racks to provide connections between network equipment. Patch panels typically comprise a plurality of connector locations wherein a variety of jacks, including, but not limited to, copper and fiber, may be mounted. The jacks allow for rapid connection and disconnection. One type of jack and plug arrangement for a patch panel is an RJ45-type connector. A cable manager may provide cable management to keep the various cables organized and reduce entanglement and damage. A cable manager may also provide a support structure whereon the plurality of cables may be supported to alleviate excessive bending.

The cable manager need not be mounted on the rack or other equipment. In one embodiment, the cable manager is made of a lightweight and semi-rigid material, such as foam rubber or Neoprene, so that the cable manager can be supported by the attached cables without the need for further support. The cable manager can thus eliminate the need for unnecessary structure in the rack or cabinet.

Figure 2:
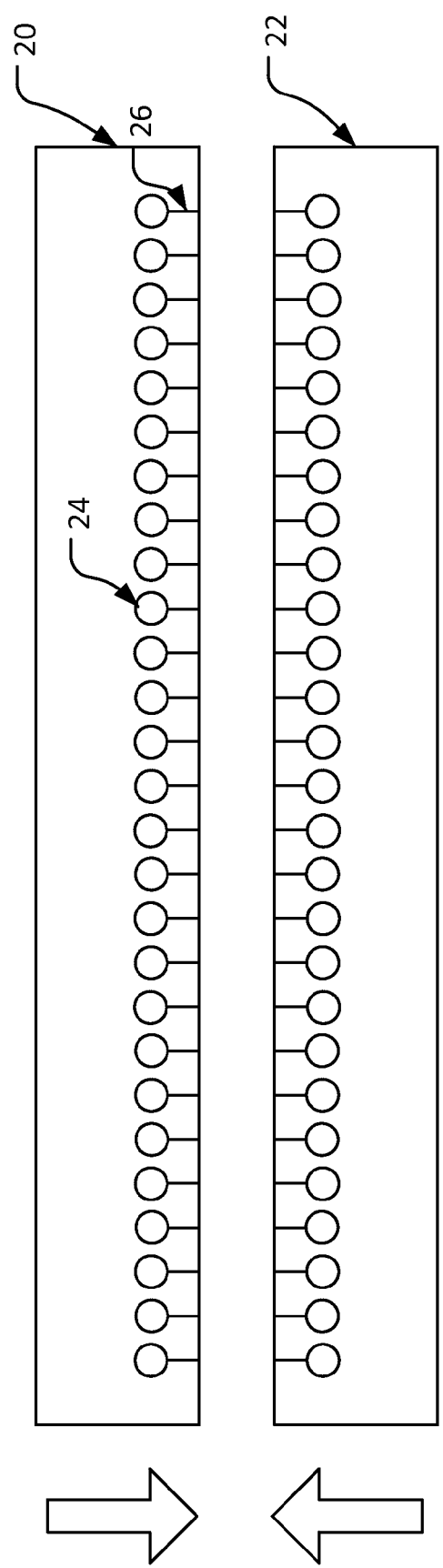
FIG. 2 is a diagram illustrating another perspective of a mechanism for managing cables in accordance with the present disclosure.

FIG. 2 shows another example of cable managers 20 and 22. In one implementation, cable managers 20 and 22 are oriented so that cable holding channels 24 and their corresponding cable entry openings 26 are facing the cables (not shown). As indicated by the arrows, the cable managers 20 and 22 engage the cables from opposite directions so that the cables are engaged more securely. This is an optional configuration, and in some implementations, a single cable manager 20 may be used to sufficiently retain the cables. For example, it may be difficult or impossible to engage the cables from two directions depending on the rack or equipment configuration. The amount of overlap between cable managers 20 and 22 may vary depending on the length of the cable entry openings 26 and the size of the cable holding channels 24.

The use of cable managers 20 and 22 without the need for any intermediate elements in the equipment rack allows for quick and easy insertion of cables without the need to remove cables and otherwise disrupt operation of the equipment. Furthermore, removal of the cable managers 20 and 22 from the cables can also be performed without disrupting operation. By allowing for easy and immediate alignment of the cables with corresponding cable entry openings 26, immediate retention of the cables at the connection points is possible and provides retention of the designated port layout for the cables.

Figure 3:
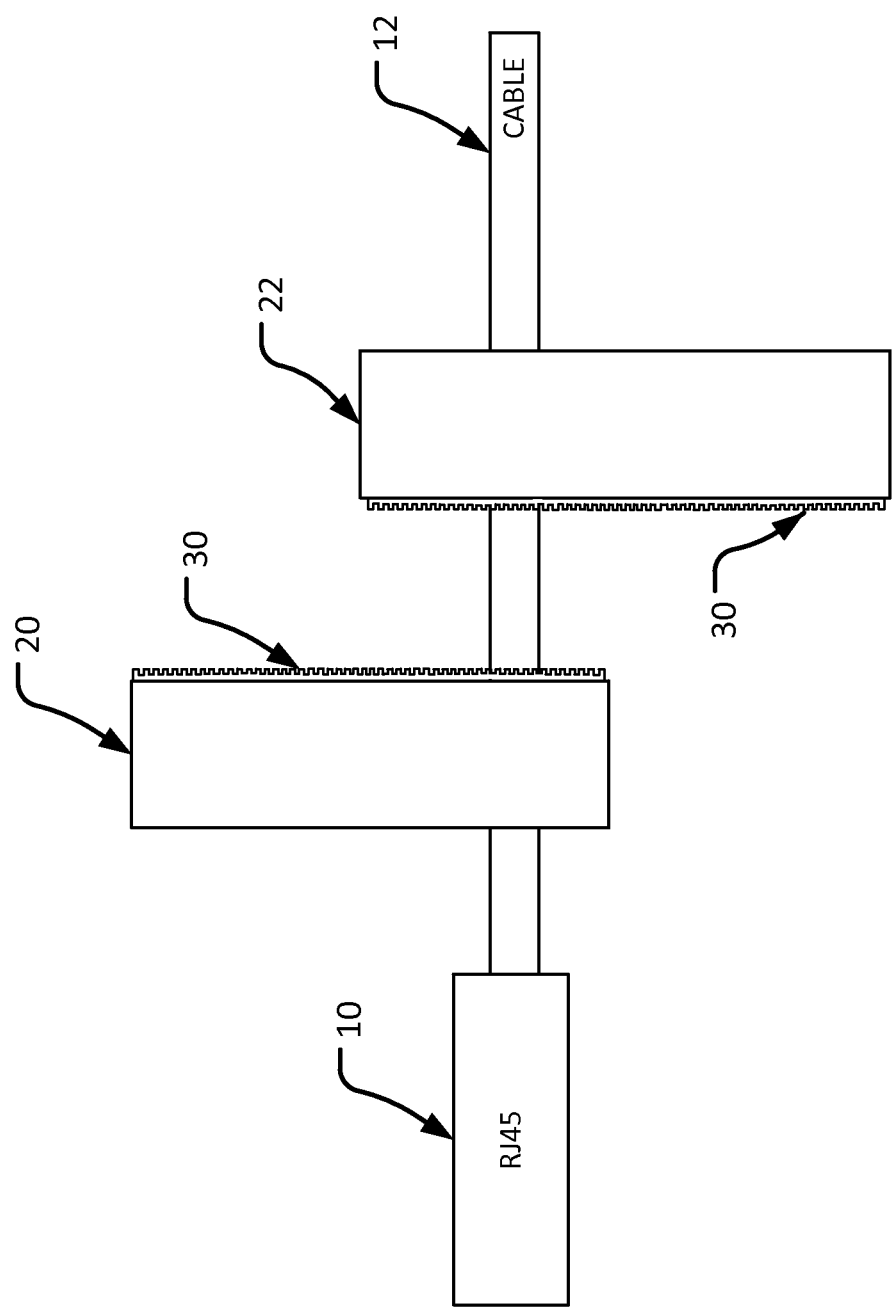
FIG. 3 is a diagram illustrating another perspective of a mechanism for managing cables in accordance with the present disclosure.

FIG. 3 provides a cross-sectional view of cable managers 20 and 22 retaining cable 12 with corresponding jack 10. In one optional implementation, cable managers 20 and 22 may have a hook-and-loop fastener 30 (e.g., Velcro®) or other attachment means disposed on at least one surface so that cable managers 20 and 22 can be removably secured to one another after engagement of the cables. This provides for additional retention and resistance to inadvertent removal or detachment during use.

Cable manager 20 may include any number of cable holding channels 24 and cable entry openings 26, as shown in FIG. 1, to allow for use with a variety of equipment and cable configurations. In one example implementation, a cable manager 20 can be configured with twenty-four cable holding channels 24 and their corresponding cable entry openings 26 for twenty-four RJ-type connectors.

The cable holding channels 24 may be adapted to provide the proper dimensions and shape for receiving and holding the cables. In the illustrated embodiment in FIGS. 1 and 2, the cable holding channels 24 are generally rounded, but may be shaped differently if the cables in a particular application are flat or otherwise non-circular. For example, the cable holding channels 24 can be rectangular, square, or oval.

The cable holding channels 24 may also be adapted to provide the proper opening dimensions for holding the cable 12 therein. In one embodiment, a single dimension for cable holding channels 24 may be provided that can be used for a category of network device such as an L2 switch for CAT 5 cables or for fiber optic cables. For example, the diameter for cable holding channels 24 may be ¼ to ½ inches. The relative spacing of the cable holding channels 24 may be configured to be useable with typical categories of network devices and their associated port spacing.

In one embodiment, the cable holding channels 24 may be sized to be slightly smaller than the diameter of cable 12 so that the non-rigid material may tightly close around the cable 12 and restrict lateral and longitudinal movement by the cable 12 through the cable holding channel 24.

The cable entry openings 26 may be provided by a slit that extends from the corresponding cable holding channel 24 to the edge of the cable manager 20. Since the material is a soft material, the cable 12 may be inserted by disforming the cable entry opening 26 until the cable 12 is inserted into the cable holding channel 24.

In an embodiment, the cable manager 20 may be fabricated as a single piece. However, the cable manager 20 may also be assembled using multiple pieces.

While the present disclosure describes examples in terms of networks and network equipment racks, it should be understood that the disclosed principles may be applied to other types of devices and environments where cable retention is desired.

Networks established by or on behalf of an entity, such as a company or organization, to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment, and the like, that may be used to implement and distribute the infrastructure and services offered by the provider network.

A number of different types of computing devices may be used singly or in combination to implement the resources of the provider network in different embodiments, including general-purpose or special-purpose computer servers, storage devices, network devices, and the like.

The above described aspects of the disclosure have been described with regard to certain examples and embodiments, which are intended to illustrate but not to limit the disclosure. It should be appreciated that the subject matter presented herein extends to and encompasses such modifications and/or enhancements that will be apparent to persons skilled in the art in view of the detailed description provided herein.

The various features described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

What is claimed is:

1. An apparatus for holding a plurality of cables, the apparatus comprising two cable retention devices, each of the retention devices comprising:
   a plurality of channels configured to receive a plurality of cables having connectors, such that the cables extend toward corresponding receptacles for the connectors;
   a plurality of openings extending from the plurality of channels to an outer edge of the apparatus such that the plurality of cables can be inserted into the plurality of channels via the plurality of openings;

wherein the apparatus is comprised of a material that is sufficiently rigid to retain the plurality of cables within the plurality of channels during removal of the connectors from the corresponding receptacles;

wherein the material is sufficiently pliable to allow insertion of the plurality of cables into the plurality of channels via the plurality of openings; and wherein the two cable retention devices are attached to one another such that the plurality of openings on each of the two cable retention devices extend from the plurality of channels on each of the two cable retention devices in opposite directions.

2. The apparatus of claim 1, wherein the apparatus is substantially rectangular and the plurality of channels are aligned linearly along a longitudinal axis of the apparatus.

3. The apparatus of claim 2, wherein a number of the plurality of channels is selected based on a number of connectors on a device adapted to receive the connectors.

4. The apparatus of claim 1, further comprising means for removably attaching the apparatus to another apparatus for holding the plurality of cables.

5. The apparatus of claim 1, wherein each of the plurality of channels has a corresponding one of the plurality of openings, and wherein each channel and corresponding opening extend generally perpendicular to a longitudinal edge of the apparatus.

6. The apparatus of claim 5, wherein the plurality of openings are perpendicular to the longitudinal edge of the apparatus.

7. The apparatus of claim 1, wherein each of the plurality of channels are sized and shaped to substantially retain a network cable.

8. A method of retaining a plurality of cables having attached connectors, the method comprising:

inserting, into a plurality of channels of a first cable management device, the plurality of cables from an outer edge of the first cable management device; and inserting, into a plurality of channels of a second cable management device, the plurality of cables from an outer edge of the second cable management device;

wherein:

the plurality of cables extend toward corresponding receptacles for connectors;

the first and second cable management devices are comprised of a semi-rigid material; and the first and second cable management devices are attached to one another such that a plurality of openings on each of the first and the second cable management devices extend from the plurality of channels on each of the first and the second cable management devices in opposite directions.

9. The method of claim 8, wherein the semi-rigid material is sufficiently rigid to retain the plurality of cables within the plurality of channels of the first and second cable management devices and sufficiently pliable to allow insertion of the plurality of cables of the first and second cable management devices into the plurality of channels of the first and second cable management devices via a plurality of openings of the first and second cable management devices.

10. The method of claim 8, wherein the first and second cable management devices are substantially rectangular and the plurality of channels of the first and second cable management devices are aligned linearly along a longitudinal axis of the first and second cable management devices.

11. The method of claim 10, wherein a number of the plurality of channels of the first and second cable management devices corresponds to a number of connectors on a device adapted to receive the connectors.

12. The method of claim 8, wherein the first and second cable management devices comprise an attachment mechanism for removably attaching the first and second cable management devices to one another.

13. The method of claim 8, wherein each of the plurality of channels of the first and second cable management devices has a corresponding one of the plurality of openings, and wherein each channel and corresponding opening extend generally parallel to a longitudinal edge of the first and second cable management devices.

14. The method of claim 12, wherein the attachment mechanism is a hook-and-loop fastener.

15. A retention apparatus for cables, comprising:

two retentions devices each comprising:

a plurality of channels configured to receive a plurality of cables having connector ends;

a plurality of openings extending from the plurality of channels to an outer edge of the retention device such that the plurality of cables can be inserted into the plurality of channels; and wherein the two retention devices are fabricated to be semi-rigid, and wherein the two retention devices are attached to one another such that the plurality of openings on each of the two retention devices extend from the plurality of channels on each of the two retention devices in opposite directions.

16. The retention device of claim 15, wherein the two retention devices are substantially rectangular and the plurality of channels on each of the two retention devices are aligned linearly along a longitudinal axis of on each of the two retention devices.

17. The retention device of claim 15, wherein the two retention devices comprise one of foam rubber or Neoprene.

18. The retention device of claim 15, wherein the two retention devices are fabricated to be sufficiently semi-rigid to retain the plurality of cables within the plurality of channels on each of the two retention devices, and wherein the two retention devices are fabricated to be sufficiently flexible to allow insertion of the plurality of cables into the plurality of channels on each of the two retention devices via the plurality of openings on each of the two retention devices.

19. The retention device of claim 15, wherein, for each of the two retention devices, each of the plurality of channels has a corresponding one of the plurality of openings, and wherein each channel and corresponding opening extend generally parallel to a longitudinal edge of the retention device.

20. The retention device of claim 15, wherein two retention devices are substantially sized and shaped to retain cables of a network device with a plurality of connector ports.

* * * * *